United States Patent [19]

Mine et al.

[11] Patent Number: 5,338,817
[45] Date of Patent: Aug. 16, 1994

[54] METHOD FOR THE PREPARATION OF A SILICONE RESIN

[75] Inventors: Katsutoshi Mine; Takashi Nakamura; Motoshi Sasaki, all of Chiba, Japan

[73] Assignee: Dow Corning Toray Silicone Co., Ltd., Tokyo, Japan

[21] Appl. No.: 155,894

[22] Filed: Nov. 23, 1993

[30] Foreign Application Priority Data

Feb. 9, 1993 [JP] Japan ................................. 5-044589

[51] Int. Cl.$^5$ ............................................. C08G 77/06
[52] U.S. Cl. ........................................ 528/12; 528/21; 528/23; 528/31; 528/34
[58] Field of Search ....................... 528/34, 31, 12, 23, 528/21

[56] References Cited

U.S. PATENT DOCUMENTS 2,857,356 10/1958 Goodwin .............................. 260/42
4,707,531 11/1987 Shirahata .............................. 528/12

*Primary Examiner*—Melvyn I. Marquis
*Attorney, Agent, or Firm*—Roger E. Gobrogge

[57] ABSTRACT

Disclosed is a method for the preparation of high molecular-weight silicone resins that have excellent storage stability in solution form. The method comprises the hydrolysis and condensation of a disiloxane and an alkyl silicate in an aqueous solution which contains at least 30 weight % alcohol and at least 5 weight % inorganic acid followed by isolation of the resin with an organic solvent which is poorly soluble in water and which has a dielectric constant of at least 4.

16 Claims, No Drawings

METHOD FOR THE PREPARATION OF A SILICONE RESIN

BACKGROUND OF THE INVENTION

The present invention relates to a method for the preparation of a silicone resin. More specifically, the present invention relates to a method for preparing a silicone resin composed of monofunctional siloxane units (M units) and tetrafunctional siloxane units (Q units).

Silicone resins composed of monofunctional (M) and tetrafunctional (Q) siloxane units are used as starting materials for pressure-sensitive adhesives, as reinforcing components for silicone rubber compositions, and as starting materials for film-forming materials such as silicone varnishes, etc. Methods proposed for the preparation of such silicone resins include the following: (a) cohydrolysis by the addition of water to a mixture of alkyl silicate and hydrolyzable trialkylsilane (U.S. Pat. No. 2,857,356), and (b) dripping alkyl silicate into a mixed system of organosilicon compound(s) (selected from disiloxanes and hydrolyzable triorganosilanes) in aqueous hydrochloric acid solution (Japanese Patent Publication Number Hei 3-60851 [60,851/1991]).

To be useful as a film-forming material, this type of silicone resin should have a high-molecular-weight because the development of excellent film-forming properties depends on the molecular weight of the silicone resin. However, when high-molecular-weight silicone resin is prepared by the methods taught in U.S. Pat. No. 2,857,356 and Japanese Patent Publication Number Hei 3-60851 (addition of fewer moles of the hydrolyzable trialkylsilane or disiloxane precursor for the monofunctional siloxane (M) unit than moles of the alkyl silicate precursor for the tetrafunctional siloxane (Q) unit), either the product undergoes gelation or the product has a very poor storage stability when stored in solution form.

The present invention takes as its object the introduction of a method for the preparation of high-molecular-weight silicone resin that has all excellent storage stability in solution form.

SUMMARY OF THE INVENTION

The present invention relates to a method for the preparation of silicone resin. The method comprises the hydrolysis and condensation of (A) a disiloxane with the general formula [R$^1$$_2$HSi]$_2$O (wherein R$^1$=monovalent hydrocarbon group) and (B) an alkyl silicate with the general formula Si(OR$^2$)$_4$ (wherein R$^2$=alkyl) in an aqueous solution which contains at least 30 weight % alcohol and at least 5 weight % inorganic acid. The molar proportion of disiloxane to alkyl silicate in this mixture is in the range of=0.05–0.6. The silicone resin is subsequently isolated with an organic solvent which is poorly soluble in water and which has a dielectric constant of at least 4.

DETAILED DESCRIPTION OF THE INVENTION

The method of the present invention produces a high molecular-weight silicone resin that has excellent storage stability in solution form. Essentially, the process comprises the hydrolysis and condensation of (A) a disiloxane and (B) an alkyl silicate in (C) an aqueous solution that contains an alcohol and an inorganic acid followed by isolation of the resin with (D) an organic solvent.

The disiloxane comprising component (A) in the method of the present invention is the source of the monofunctional siloxane unit (M unit) in the silicone resin product. This disiloxane has the following general formula:

[R$^1$$_2$HSi]$_2$O

R$^1$ in this formula is a monovalent hydrocarbon group. It is specifically exemplified by alkyl groups such as methyl, ethyl, propyl, butyl, pentyl, etc.; aryl groups such as phenyl, tolyl, xylyl, naphthyl, etc.; and aralkyl groups such as benzyl, phenethyl, etc. The methyl group is preferred. The disiloxane comprising component (A) is exemplified by 1,1,3,3-tetramethyldisiloxane, 1,3-dimethyl-1,3-diethyldisiloxane, 1,1-dimethyldisiloxane, 1,1,3,3-tetraphenyldisiloxane, and 1,3-dimethyl-1,3-diphenyldisiloxane. Mixtures of two or more of the preceding can also be used as component (A).

The alkyl silicate comprising component (B) in the method of the present invention is the source of the tetrafunctional siloxane unit (Q unit) in the silicone resin product. This alkyl silicate has the following general formula:

Si(OR$^2$)$_4$

R$^2$ in the preceding formula represents alkyl groups. They are specifically exemplified by methyl, ethyl, and propyl. The methyl group is preferred due to ease of acquisition and because the hydrolysis rate of component (B) increases as the number of carbons in the alkyl group declines. The alkyl silicates comprising component (B) are generally available commercially as the orthosilicates. Component (B) is specifically exemplified by methyl orthosilicate, ethyl orthosilicate, and isopropyl orthosilicate. Combinations of two or more of the preceding can also be used as component (B). Methyl orthosilicate and ethyl orthosilicate are preferred due to ease of acquisition and because the hydrolysis rate increases with diminishing number of carbons in the alkyl group in the alkyl silicate.

In the method of the present invention, components (A) and (B) must be mixed in a proportion such that the moles of component (A)/moles of component (B)=0.05–0.6. When the value of moles component (A)/moles component (B) falls below 0.05, high molecular weight silicone resin can be obtained but gelation also occurs very readily at such values. While gelation of the silicone resin product is inhibited at values in excess of 0.6, the silicone resin obtained at such values will have a low molecular weight and poor film-forming properties.

The preparative method of the present invention begins with the cohydrolysis/condensation of the aforementioned components (A) and (B) in aqueous solution (component (C) which contains at least 30 weight % alcohol and at least 5 weight % inorganic acid. Through the use of an aqueous alcohol solution as the cohydrolysis solution, the preparative method of the present invention moderates the hydrolysis and condensation rate of component (B) and thereby prevents an increase in molecular weight by the silicone resin product to the point of gelation.

There are no particular restrictions on the alcohols useable in the aqueous solution comprising component (C). Operable alcohols are exemplified by methyl alcohol, ethyl alcohol, isopropyl alcohol, and n-propyl alcohol. Methyl alcohol and ethyl alcohol are preferred because lower boiling points facilitate post-synthesis solvent replacement by component (D) of the silicone resin.

Component (C) in the preparative method of the present invention must contain at least 30 weight % alcohol. An alcohol content of less than 30 weight % fails to moderate the hydrolysis and condensation rate of component (B) in the reaction between components (A) and (B) and therefore cannot prevent an increase in molecular weight by the silicone resin product to the point of gelation.

In addition to alcohol, the aqueous solution comprising component (C) may also contain water-soluble organic solvents insofar as the object of the present invention is not impaired.

There are no specific restrictions on the inorganic acid used in the aqueous solution comprising component (C). The inorganic acid is specifically exemplified by hydrochloric acid, sulfuric acid, and nitric acid. Hydrochloric acid is preferred because it can be easily removed from the silicone resin reaction mixture after synthesis of the silicone resin.

The preparative method in accordance with the present invention requires that component (C) contain at least 5 weight % inorganic acid. An inorganic acid content below 5 weight % results in a slow component (A) cleavage reaction during the reaction between components (A) and (B). This results in the preferential development of the hydrolysis and condensation of component (B) and, thus, an increase in molecular weight to the point of gelation.

The quantity of component (C) used in the method of the present invention is not specifically restricted. Component (C) is preferably added in a quantity that makes possible a thorough hydrolysis and condensation of component (B).

The reaction temperature is also not specifically restricted in the preparative method in accordance with the present invention. By way of example, the reaction temperature preferably does not exceed 30° C. and more preferably does not exceed 15° C.

A characteristic feature of the present invention is that the silicone resin afforded by the hydrolysis and condensation reaction as described hereinbefore is separated using organic solvent (component (D) which is poorly soluble in water and which has a dielectric constant of at least 4. The basis for this feature is that the presence of inorganic acid in the silicone resin product results in a deterioration of the storage stability of the silicone resin and causes corrosion of treated surfaces when the silicone resin is employed as a coating agent. Impurities such as the inorganic acid, etc., can be removed from the silicone resin by thoroughly dissolving the silicone resin from the reaction mixture into component (D) and washing with water. The organic solvent comprising component (D) must be poorly soluble in water, i.e., it must form two layers with water, and it must have a dielectric constant of at least 4, but it is not otherwise particularly restricted. The organic solvent comprising component (D) is specifically exemplified by ether solvents such as diethyl ether (dielectric constant=4.197), diisopropyl ether (dielectric constant=4.49), anisole (dielectric constant=4.33), phenetole (dielectric constant=4.22), 1,2-dimethoxyethane (dielectric constant=5.50), 1,2-diethoxyethane (dielectric constant=5.10), etc.; ketone solvents such as methyl ethyl ketone (dielectric constant=18.51), methyl isobutyl ketone (dielectric constant=13.11), 2-heptanone (dielectric constant=9.77), etc.; ester solvents such as butyl acetate (dielectric constant=5.01), isobutyl acetate (dielectric constant=5.29), diethyl sebacate (dielectric constant=5.00), etc.; and other organic solvents such as chloroform (dielectric constant=4.335).

The sequence for addition of component (D) is not specifically restricted in the method of the present invention. For example, a mixture of components (C) and (D) may first be prepared, and components (A) and (B) then reacted in such a system. Alternatively, components (A) and (B) may first be reacted in component (C), and component (D) then immediately added to the resulting system. The thorough dissolution from the reaction system of the high-molecular-weight silicone resin product is made possible by the fact that the organic solvent comprising component (D) has a dielectric constant of at least 4 and is, therefore, highly polar. Furthermore, in the case of silicone resin solutions prepared using this solvent, drying of the solution affords an additional improvement in the solution storage stability.

The quantity of component (D) is not specifically restricted in the preparative method of the present invention. Component (D) is preferably added in a quantity that can thoroughly dissolve the silicone resin that is produced.

There are no specific restrictions on the molecular weight of the silicone resin afforded by the preparative method of the present invention. However, in order to make possible use of the silicone resin product as the base component for coatings, the silicone resin product preferably is a high-molecular-weight silicone resin with a number-average molecular weight of at least 3,000. The high molecular weight and excellent film-forming properties of the silicone resin afforded by the preparative method of the present invention enable its application (in addition to its application for coatings) as an additive for a variety of silicone rubber compositions, as an additive for silicone varnishes, and so forth.

The present invention is explained in greater detail below through working examples.

EXAMPLE 1

20 g methanol, 12.1 g 7.4 N hydrochloric acid (0.07 moles hydrogen chloride), and 4.69 g (0.035 moles) 1,1,3,3-tetramethyldisiloxane were weighed into a 200 mL four-neck flask equipped with a spiral condenser, thermometer, and straight tube-equipped addition funnel. The solution temperature was reduced to $\leq 5°$ C. by ice cooling, and nitrogen was passed through the system at a very low flow rate. While stirring the solution under these conditions, 30.4 g (0.2 moles) methyl orthosilicate was dripped in over 40 minutes from the straight tube-equipped addition funnel. The solution temperature rose to 13° C. during this period due to the evolution of heat, but declined to 8° C. by the time addition was completed. After the completion of addition, the reaction was stirred for an additional 15 minutes while cooling with ice and was then stirred for 4 hours at room temperature. The reaction solution was colorless and transparent. 100 mL methyl isobutyl ketone and then 100 mL water were added to the reaction solution, whereupon phase-separation into two layers occurred. The lower layer was taken off and shaken out with 50 mL methyl isobutyl ketone, and after phase-separation the upper layer was collected and combined with the first upper layer. 200 mL water was added to this and the system was shaken. Because this yielded an emulsion, 200 mL diethyl ether was added. Quiescence then resulted in phase-separation. The lower layer was discarded and the upper layer was collected and held for 10 hours over magnesium sulfate. The magnesium sulfate was then filtered off and the filtrate was concentrated to a solids concentration of 30 weight %. This concentrate was directly diluted with tetrahydrofuran to prepare a solution with a solids concentration of 0.2 weight %. This solution was subjected to gel permeation chromatography using tetrahydrofuran as carrier solvent, and the dissolved component was thereby determined to have a number-average molecular weight of 3,620, a weight-average molecular weight of 7,050, and a dispersity of 1.95. The dissolved component was determined by $^{29}$Si nuclear magnetic resonance spectroscopic analysis to be silicone resin with the following structural formula:

$$[H(CH_3)_2SiO_{\frac{1}{2}}]_{0.35}[SiO_{4/2}]_{1.0}$$

The concentrate was dripped onto a silicon wafer and the solvent was evaporated off by standing in air at room temperature to produce a film of the solids with a thickness of approximately 1 micrometer. This film was subjected to transmission mode-based structural analysis using a Fourier-transform infrared spectrochemical analyzer. A broad, strong absorption peak assigned to the siloxane bond was observed in the region of 1100 cm$^{-1}$, a sharp, strong absorption peak assigned to the Si-CH$_3$ group was observed in the region of 1260 cm$^{-1}$, a sharp, strong absorption peak assigned to the SiH group was observed in the region of 2150 cm$^{-1}$, and a sharp, medium absorption peak assigned to the C-H group was observed in the region of 2960 cm$^{-1}$.

Neither the viscosity of the solution nor the molecular weight of the dissolved component underwent variation during storage of the concentrate at room temperature for 1 month sealed in a wide-mouth high-density polyethylene bottle.

EXAMPLE 2

20 g methanol, 12.1 g 7.4 N hydrochloric acid (0.07 moles hydrogen chloride), and 6.70 g (0.05 moles) 1,1,3,3-tetramethyldisiloxane were weighed into a 200 mL four-neck flask equipped with a spiral condenser, thermometer, and straight tube-equipped addition funnel. The solution temperature was reduced to ≦5° C. by ice cooling, and nitrogen was passed through the system at a very low flow rate. While stirring the solution under these conditions, 30.4 g (0.2 moles) methyl orthosilicate was dripped in over 40 minutes from the straight tube-equipped addition funnel. The solution temperature rose to 14° C. during this period due to the evolution of heat, but declined to 8° C. by the time addition was completed. After the completion of addition, the reaction was stirred for an additional 15 minutes while cooling with ice and was then stirred for 4 hours at room temperature. The reaction solution was colorless and transparent. 100 mL methyl isobutyl ketone and then 100 mL water were added to the reaction solution, whereupon phase-separation into two layers occurred. The lower layer was taken off and shaken out with 50 mL methyl isobutyl ketone, and after phase-separation the upper layer was collected and combined with the first upper layer. 200 mL water was added to this and the system was shaken. Because this yielded an emulsion, 100 mL diethyl ether was added. Quiescence then resulted in phase-separation. The lower layer was removed, another 200 mL water was added, and the system was shaken. A rapid phase-separation occurred upon standing in this case. The upper layer was collected and held for 10 hours over magnesium sulfate. The magnesium sulfate was subsequently filtered off and the filtrate was concentrated to a solids concentration of 30 weight %. This concentrate was directly diluted with tetrahydrofuran to prepare a solution with a solids concentration of 0.2 weight %. This solution was subjected to gel permeation chromatography using tetrahydrofuran as carrier solvent, and the dissolved component was thereby determined to have a number-average molecular weight of 3,310, a weight-average molecular weight of 5,760, and a dispersity of 1.74. The dissolved component was determined by $^{29}$Si nuclear magnetic resonance spectroscopic analysis to be silicone resin with the following structural formula:

$$[H(CH_3)_2SiO_{\frac{1}{2}}]_{0.5}[SiO_{4/2}]_{1.0}$$

The concentrate was dripped onto a silicon wafer and the solvent was evaporated off by standing in air at room temperature to produce a film of the solids with a thickness of approximately 1 micrometer. This film was subjected to transmission mode-based structural analysis using a Fourier-transform infrared spectrochemical analyzer. A broad, strong absorption peak assigned to the siloxane bond was observed in the region of 1100 cm$^{-1}$, a sharp, strong absorption peak assigned to the Si-CH$_3$ group was observed in the region of 1260 cm$^{-1}$, a sharp, strong absorption peak assigned to the SiH group was observed in the region of 2150 cm$^{-1}$, and a sharp, medium absorption peak assigned to the C—H group was observed in the region of 2960 cm$^{-1}$.

Neither the viscosity of the solution nor the molecular weight of the dissolved component underwent variation during storage of the concentrate at room temperature for 1 month sealed in a wide-mouth high-density polyethylene bottle.

COMPARISON EXAMPLE 1

5 g methanol, 20 g toluene, 12.1 g 7.4 N hydrochloric acid (0.07 moles hydrogen chloride), and 4.69 g (0.035 moles) 1,1,3,3-tetramethyldisiloxane were weighed into a 200 mL four-neck flask equipped with a spiral condenser, thermometer, and straight tube-equipped addition funnel. The solution temperature was reduced to ≦5° C. by ice cooling, and nitrogen was passed through the system at a very low flow rate. While stirring the solution under these conditions, 30.4 g (0.2 moles) methyl orthosilicate was dripped in over 40 minutes from the straight tube-equipped addition funnel. The solution temperature rose to 13° C. during this period due to the evolution of heat, but declined to 9° C. by the time addition was completed. After the completion of addition, the reaction was stirred for an additional 15 minutes while cooling with ice and was then stirred for 4 hours at room temperature. The reaction solution was an emulsion at this point. When the system was held at room temperature while purging with nitrogen, the reaction solution gelled within 12 hours.

That which is claimed is:

1. A method for preparing a silicone resin comprising:

(I) hydrolyzing and condensing (A) a disiloxane with the general formula $$[R^1{}_2HSi]_2O$$

and (B) an alkyl silicate with the general formula $$Si(OR^2)_4$$

in (C) an aqueous solution which contains at least 30 weight % alcohol and at least 5 weight % inorganic acid; wherein $R^1$ is a monovalent hydrocarbon group, $R^2$ is an alkyl group; and components (A) axle (B) are used in a proportion such that the moles of component (A)/moles of component (B) is in the range of 0.05–0.6; and (II) isolating the silicone resin product with (D) an organic solvent which is poorly soluble in water and which has a dielectric constant of at least 4.

2. The method of claim 1 wherein $R^1$ is selected from the group consisting of alkyl groups, aryl groups and aralkyl groups.

3. The method of claim 1 wherein $R^1$ is methyl.

4. The method of claim 1 wherein the disiloxane is selected from the group consisting of 1,1,3,3-tetramethyldisiloxane, 1,3-dimethyl-1,3-diethyldisiloxane, 1,1-dimethyldisiloxane, 1,1,3,3-tetraphenyldisiloxane, and 1,3-dimethyl-1,3-diphenyldisiloxane.

5. The method of claim 1 wherein $R^2$ is selected from the group consisting of methyl, ethyl, and propyl.

6. The method of claim 1 wherein $R^2$ is methyl.

7. The method of claim 1 wherein the alkyl silicate is selected from the group consisting of methyl orthosilicate, ethyl orthosilicate, and isopropyl orthosilicate.

8. The method of claim 1 wherein the alcohol is selected from the group consisting of methyl alcohol, ethyl alcohol, isopropyl alcohol, and n-propyl alcohol.

9. The method of claim 1 wherein the aqueous solution (C) also contains a water-soluble organic solvent.

10. The method of claim 1 wherein the inorganic acid is selected from the group consisting of hydrochloric acid, sulfuric acid, and nitric acid.

11. The method of claim 1 wherein the inorganic acid is hydrochloric acid.

12. The method of claim 1 wherein the hydrolysis and condensation reactions occur at a temperature less than 30° C.

13. The method of claim 1 wherein the organic solvent (D) is selected from the group consisting of ether solvents, ketone solvents, ester solvents, and chloroform.

14. The method of claim 1 wherein the silicone resin has a number-average molecular weight of at least 3,000.

15. A method for preparing a silicone resin comprising:

(I) mixing an aqueous solution (C) which contains at least 30 weight % alcohol and at least 5 weight % inorganic acid with an organic solvent (D) which is poorly soluble in water and which has a dielectric constant of at least 4; and (II) reacting a disiloxane (A) with the general formula $$[R^1{}_2HSi]_2O$$

and (B) an alkyl silicate with the general formula $$Si(OR^2)_4$$

in the above mixture; wherein $R^1$ is a monovalent hydrocarbon group, $R^2$ is an alkyl group; and components (A) and (B) are used in a proportion such that the moles of component (A)/moles of component (B) is in the range of 0.05–0.6.

16. A method for preparing a silicone resin comprising:

(I) reacting (A) a disiloxane with the general formula $$[R^1{}_2HSi]_2O$$

and (B) an alkyl silicate with the general formula $$Si(OR^2)_4$$

in (C) an aqueous solution that contains at least 30 weight % alcohol and at least 5 weight % inorganic acid; wherein $R^1$ is a monovalent hydrocarbon group, $R^2$ is an alkyl group; and components (A) and (B) are used in a proportion such that the moles of component (A)/moles of component (B) is in the range of 0.05–0.6; and (II) adding an organic solvent (D) which is poorly soluble in water and which has a dielectric constant of at least 4 to the above hydrolysis and condensation product.

* * * * *